(12) United States Patent
Bishop et al.

(10) Patent No.: US 6,364,648 B1
(45) Date of Patent: Apr. 2, 2002

(54) FOUR AXIS CASTING FIXTURE

(75) Inventors: Joseph A. Bishop, Salem; Eric S. Dogan, Roanoke, both of VA (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 09/468,975

(22) Filed: Dec. 21, 1999

(51) Int. Cl.[7] .......................... B29C 45/80; B29D 11/00
(52) U.S. Cl. ................ 425/125; 425/127; 425/808; 249/91; 264/1.7; 264/2.4; 264/2.7
(58) Field of Search .................. 425/125, 127, 425/808; 249/83, 91; 264/1.7, 2.2, 2.4, 2.7

(56) References Cited

U.S. PATENT DOCUMENTS

| | | | |
|---|---|---|---|
| 4,716,851 A | * | 1/1988 | Saito et al. ................. 118/402 |
| 5,288,221 A | | 2/1994 | Stoerr et al. |
| 6,082,987 A | * | 7/2000 | Su et al. ..................... 425/150 |

FOREIGN PATENT DOCUMENTS

EP  796719 A1  9/1997

* cited by examiner

Primary Examiner—Nam Nguyen
Assistant Examiner—Donald Heckenberg

(57) ABSTRACT

The fixture of the invention provides a bottom portion into which a mold half is placed. Movably mounted above the bottom portion is a top portion having two horizontal plates adapted to slide relative to each other to control the X direction and Y direction and hold a preform or wafer. The top portion is further adapted to allow for the adjustment of the relative angle between the preform or wafer and mold half, as well as adjustment of the distance between the top portion and bottom portion.

24 Claims, 7 Drawing Sheets

FOUR AXIS CASTING FIXTURE

BACKGROUND OF THE INVENTION

As the popularity of plastic, as opposed to glass, spectacle lenses has grown, ways have been sought to form these products in more efficient ways. For example, lenses are known to be formed by casting a layer onto a preform, or wafer, so that subsequent machining and processing can be significantly reduced, if not totally avoided.

However, as is obvious, a spectacle lens that has been carefully prescribed must be equally carefully manufactured. If the various angles in the lens are not as prescribed by the attending ophthalmologist or optometrist, the lens will not provide the benefits sought for the user and, in fact, could actually prove detrimental. Therefore, while more efficient methods of formation have been sought, this efficiency must not be obtained at the cost of accuracy.

In one manufacturing method, production of a spectacle lens requires one or more mold halves, a resin material employed to form one or more layers of the lens, and a preform. In the prior art, no mechanical fixture, or comparable device, had been developed to hold the mold and the preform in an exact set position to assure both accuracy and reproducibility of the cast layer. While a tolerance of ±1/2° is the acceptable deviation for products of this type, the practically unregulated equipment of the prior art provided deviations of ±2°.

SUMMARY OF THE INVENTION

In accordance with the present invention, a device has been developed that allows fine control of the height (thickness) of a lens and the accurate control of the various angles specified for the spectacle lenses. Careful, and reproducible, control of each of these parameters is provided for in the fixture made in accordance with the present invention.

In general, the fixture of the present invention involves a bottom portion into which a mold half, preferably a female mold half, is placed. The bottom portion provides support so that the mold half will remain level and allow for the mold angles to be accurately controlled and reproduced. Movably mounted above the bottom portion that holds the mold half is a top portion, having two horizontal, plates adapted to slide relative to each other to control the X direction and Y direction. It also holds the preform or wafer and means are provided on this top portion to control the angular relationship of the mold half to the preform. For purposes of the invention, by "optical preform" or "preform" means a shaped, optically transparent article capable of refracting light and suitable for use in producing a spectacle lens.

Means are provided on the fixture, not only for the accurate setting and indication of each of the relationships, but also for holding the dimensions and relationships constant in order to produce a series of lenses with the same angles and dimensions and without readjusting the equipment.

DETAILED DESCRIPTION OF THE INVENTION

Figure 1:
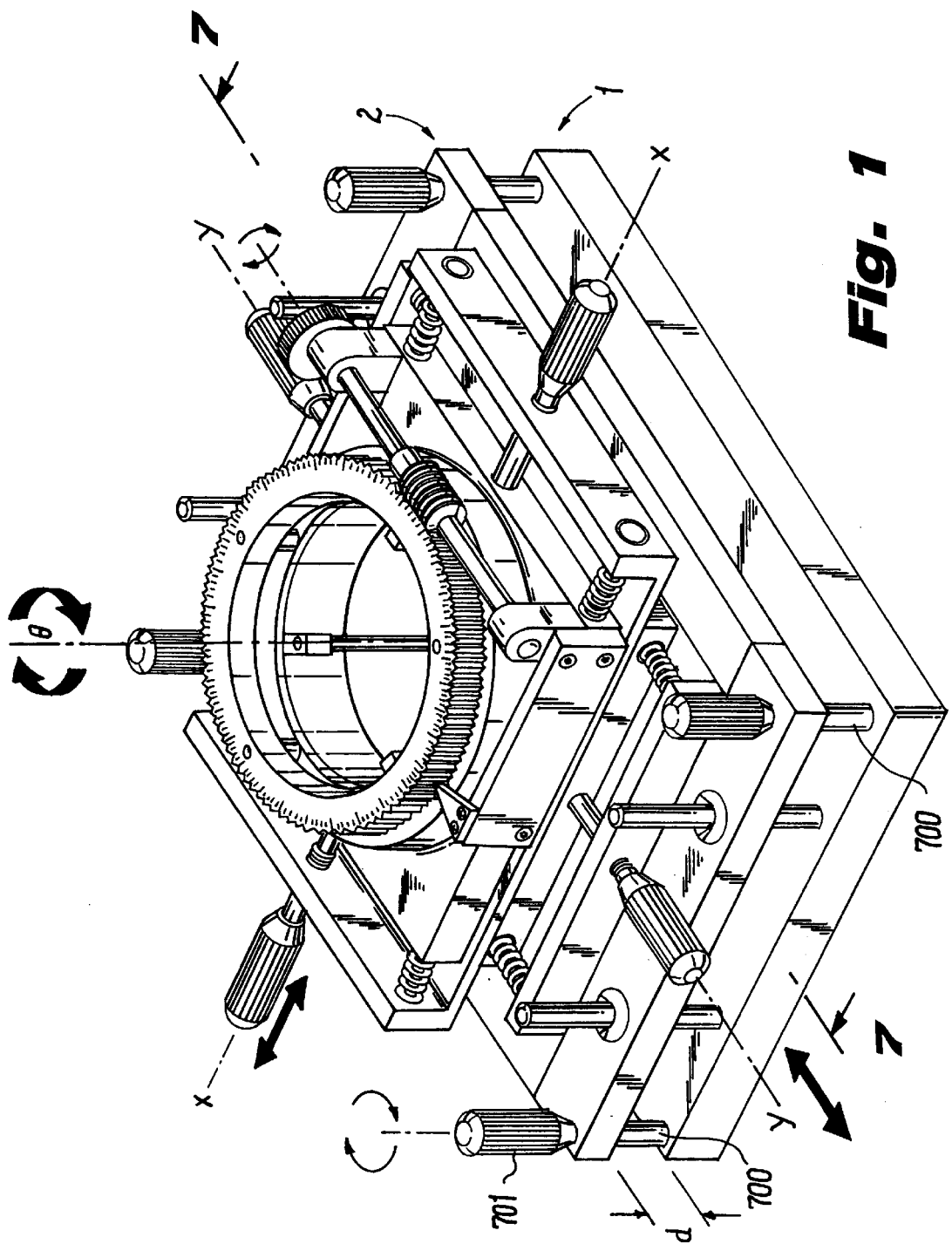
FIG. 1 is an overall perspective view of the fixture of the present invention.
Figure 2:
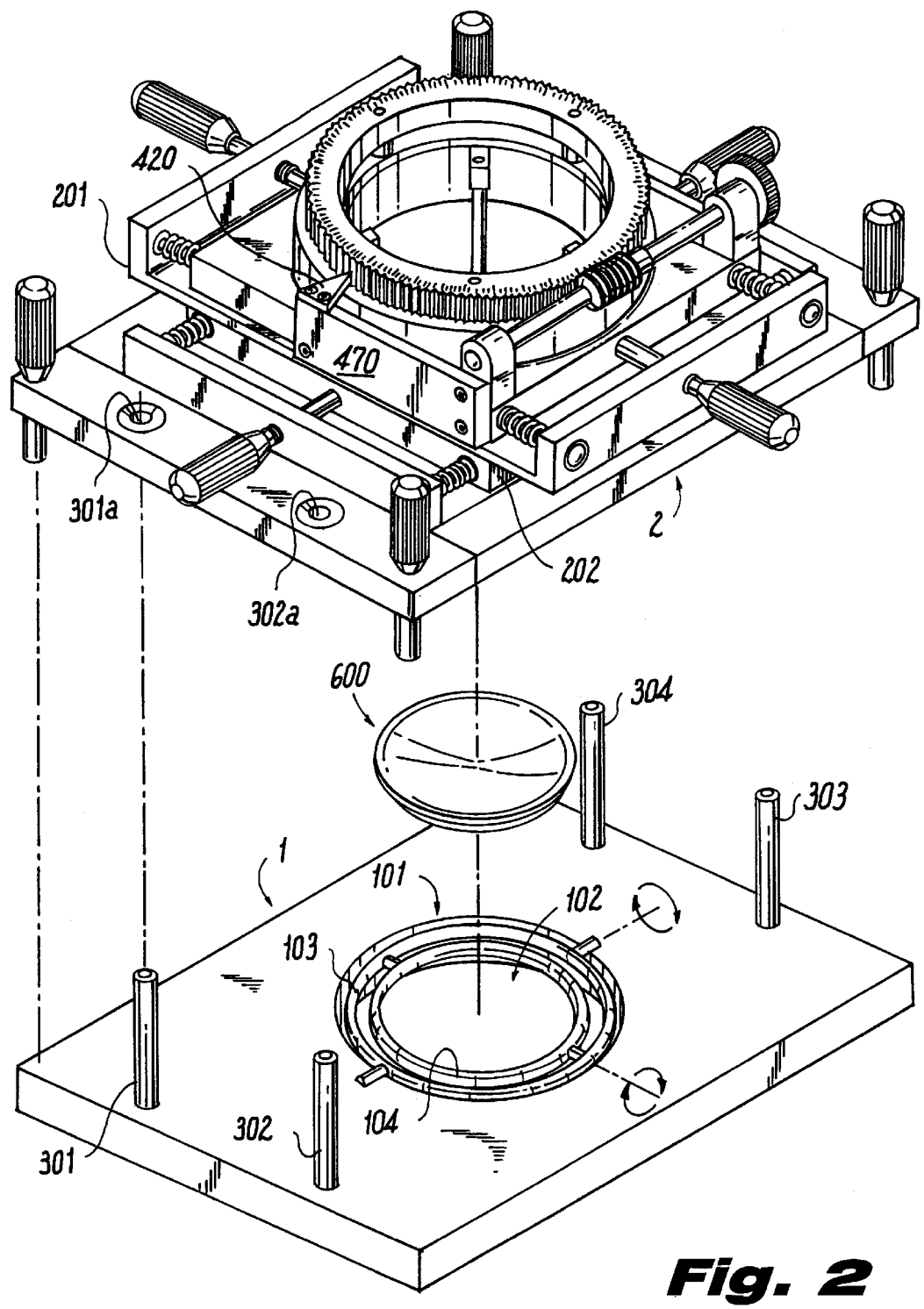
FIG. 2 is an exploded perspective view of the fixture of the present invention.

In accordance with the present invention, and referring to the drawings in particular, FIGS. 1 and 2 shows the parts of an assembled fixture. The parts include a bottom portion 1, to be described in more detail later, which carries or includes the mold half 600. Placed above the bottom portion is the top portion 2 of the fixture, which includes an adjustable upper plate 201 and an adjustable lower plate 202. Alignment between the bottom portion of the fixture and the top portion of the fixture is maintained by four pins 301, 302, 303, and 304, the pins being fixedly mounted to the bottom portion 1, while the top portion 2 is slidably mounted on the pins that pass through TEFLON® bearings 301a, 302a, and similar bearings for pins 303 and 304 on the opposite side.

As best seen in FIG. 2, the bottom portion includes a mold half holder 101 that includes a gimbal 102 having outer pivoting ring 103 and an inner pivoting ring 104, the inner pivoting ring pivoting at 90° offset from the outer pivoting ring. This assures horizontal positioning of the mold half 600.

Figure 3:
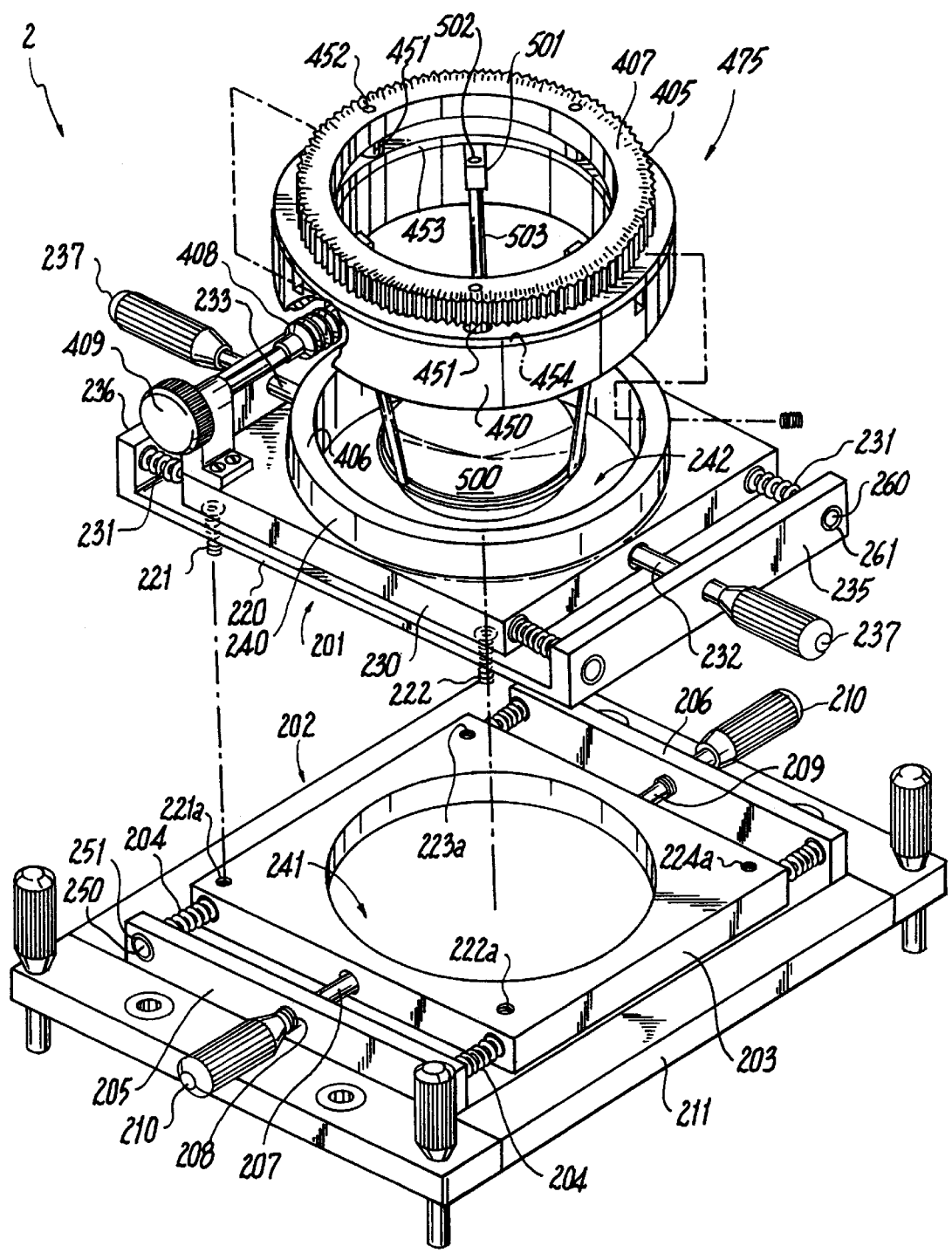
FIG. 3 is an exploded view of the components of the top portion of the fixture of the present invention.

As best shown in FIGS. 2 and 3, the top portion 2 of the fixture includes an upper plate 201 and a lower plate 202, the plates being provided with appropriate means to allow them to move relative to each other and relative to the bottom portion of the fixture, until they are locked in place. As illustrated, movable portion 203 rests on base plate 211 and is mounted between four springs placed at corners of the movable portion 203 of the plate. These springs 204 along with shoulder bolts 250, hold the movable portion 203 in place, the shoulder bolts 250, which pass through the springs 204, being connected to the movable portion 203 and slidably mounted in openings 251 in upstanding flanges 205 and 206. A rod 207 that is part of a micrometer is threadedly engaged with flange 205, as shown at 208. A corresponding rod 209 is similarly mounted at the opposite side of the movable portion 203; simultaneously moving micrometer knobs 210, the movable portion 203 can be moved in the directions shown by the double headed arrow Y that allows positioning of the optical center of the mold half and the geometric center of a preform. Appropriate reference points (not shown) are provided on the mold half 600 and preform 500 to guide this alignment. The flanges 205, 206 are rigidly attached to, or may be part of, base plate 211.

A base plate 220 of upper portion 201 is rigidly attached to the movable portion 203 of the lower plate 202. This attachment is accomplished employing four screws, only two of which, 221, 222, are shown. The female threaded portion to receive each of the screws is illustrated at 221a, 222a, 223a, and 224a. Thus, when the movable portion 203 is moved in response to turning of the micrometer rods 207, 209, the entire upper plate 201 moves with it.

The upper plate 201 has a movable portion 230 that is mounted in the same manner as the movable portion 203 of lower plate 202. Four springs 231 (only three of which are illustrated) are mounted at the corners of the movable portion 230. These springs surround shoulder bolts 260 connected to the movable portion 230 and slide in openings 261. Rods 232, 233 forming part of a micrometer are rotatably fixed in the movable portion 230 and threadedly engaged with the upstanding flanges 235, 236 which are part of or affixed to the base plate 220. Movement of the rods 232, 233 by means of micrometer handles 237 causes the movable portion 230 to move in the X direction as shown by the double headed arrow in FIG. 1. Appropriate reference points (not shown) are provided on the mold half 600 and preform 500 to guide this alignment.

The center of the movable portion 230 is provided with an upstanding cylindrical wall 240. The opening in this cylindrical wall is in general alignment with an opening 241 in the movable portion 203 and base plate 211 of the lower plate 202, and with opening 242 in the movable portion 230 and base plate 220 of the top portion.

A toothed assembly 475 is provided, including toothed ring 405, with a generally flat upper surface 407 which is provided with degree markings to allow accurate rotation of the mold half and preform. This ring is supported on a cylindrical, grooved member 450 by a series of posts 451, 3 being illustrated in the Figs. The bottom portion of the post is affixed to the cylindrical member 450 and the toothed ring is mounted to it employing screws 452.

Figure 4:
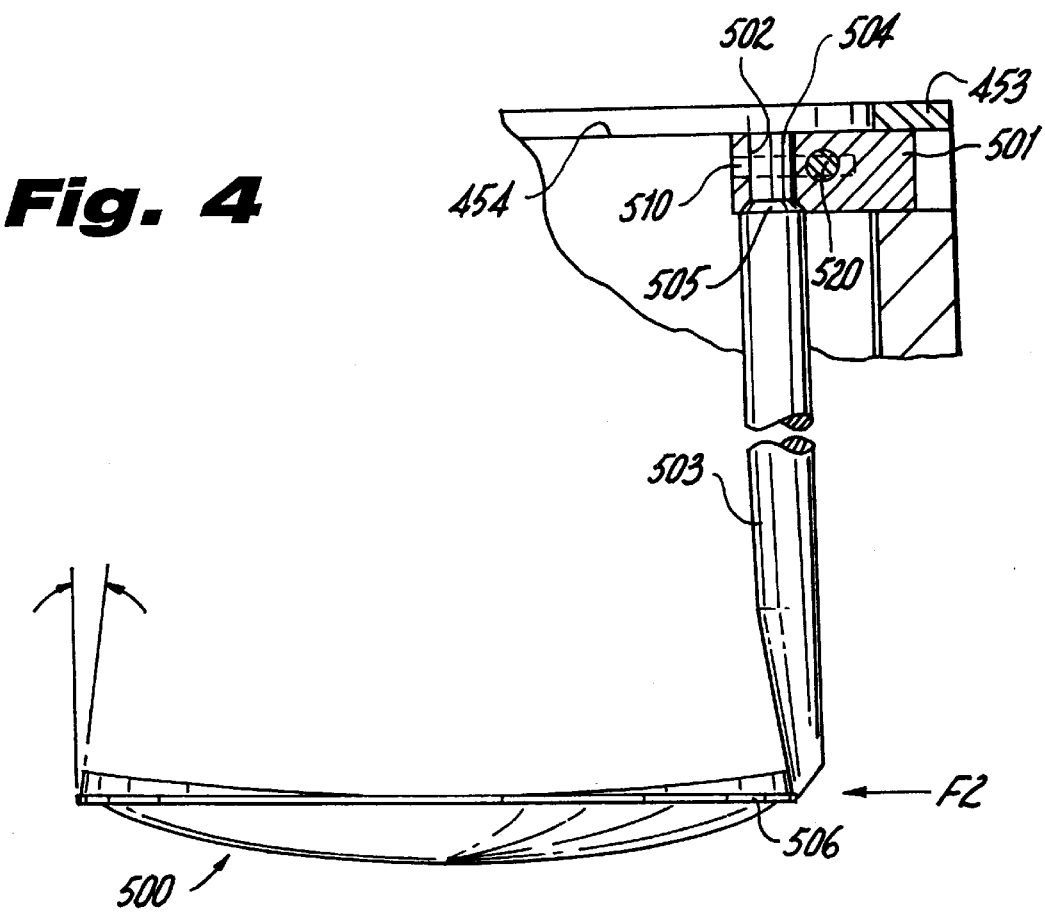
FIG. 4 is a sectional elevational view showing the preform attached to the top portion of the fixture by a pin.
Figure 5:
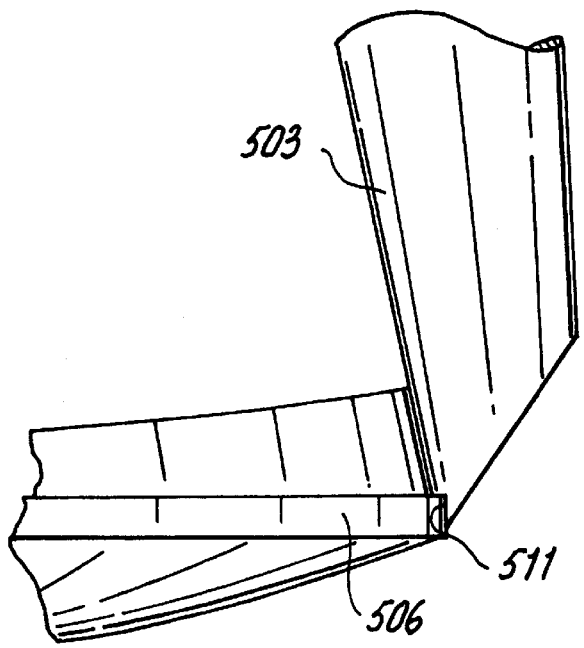
FIG. 5 is a close-up view of the draft angle between the pin and preform.

As best illustrated in FIGS. 3 through 5, the preform 500 is suspended from the grooved cylinder 450. Multiple tabs 501 are slidably affixed to the grooved cylinder 450, these tabs having openings 502. A top ring 453 is mounted to the upper, generally flat surface 454 of the grooved cylinder to hold the tabs 501 in place. Specially shaped pins 503 are inserted into these openings, as best illustrated in FIG. 4. The top portion 504 of the pin 503 has a reduced cross section to allow its insertion into opening 502. The pin has a shoulder 505 limiting upward movement. When the pin 503 has been aligned to allow it to press against a rim 506 formed on the preform 500, a rod 510, held in place by screw 520 is moved inwardly to hold the pin 503 in place. The bottom of the pin 503 is notched as shown at 511 to accommodate the rim 506 and hold the preform 500 firmly in place. While more or less pins could be employed, the ideal number is 3 to assure proper alignment. The rim 506 is approximately 1 mm. thick. The toothed ring 405 engages with worm wheel 408 controlled by knob 409. Movement of the knob 409 causes the toothed wheel 405 to rotate, carrying the preform 5 until the proper angle between the preform 500 and the mold half 600 is obtained. The angle is indicated by the pointer 420 held to the grooved cylinder 450 by arm 470. This adjustment of the angle of rotation theta allows for control of the cylinder location in toric lenses. The grooved cylinder, with the groove 460, is lowered to rest on cylindrical surface 406, allowing for pivoting of the cylinder and the toothed ring.

Spacing between the bottom portion 1 and the top portion 2 is controlled by four feet 700 mounted to the base plate 211 of the upper plate 201. These feet 700 are a portion of a micrometer 701 allowing for very fine adjustments of the feet (within 0.001 inch) and, therefore, the spacing between top portion 2 and bottom portion 1. When the device is assembled and in use, the placement of the feet controls the Z axis, the thickness of the lens, since this placement controls the depth to which the preform 500 can extend into the mold half 600.

Figure 6:
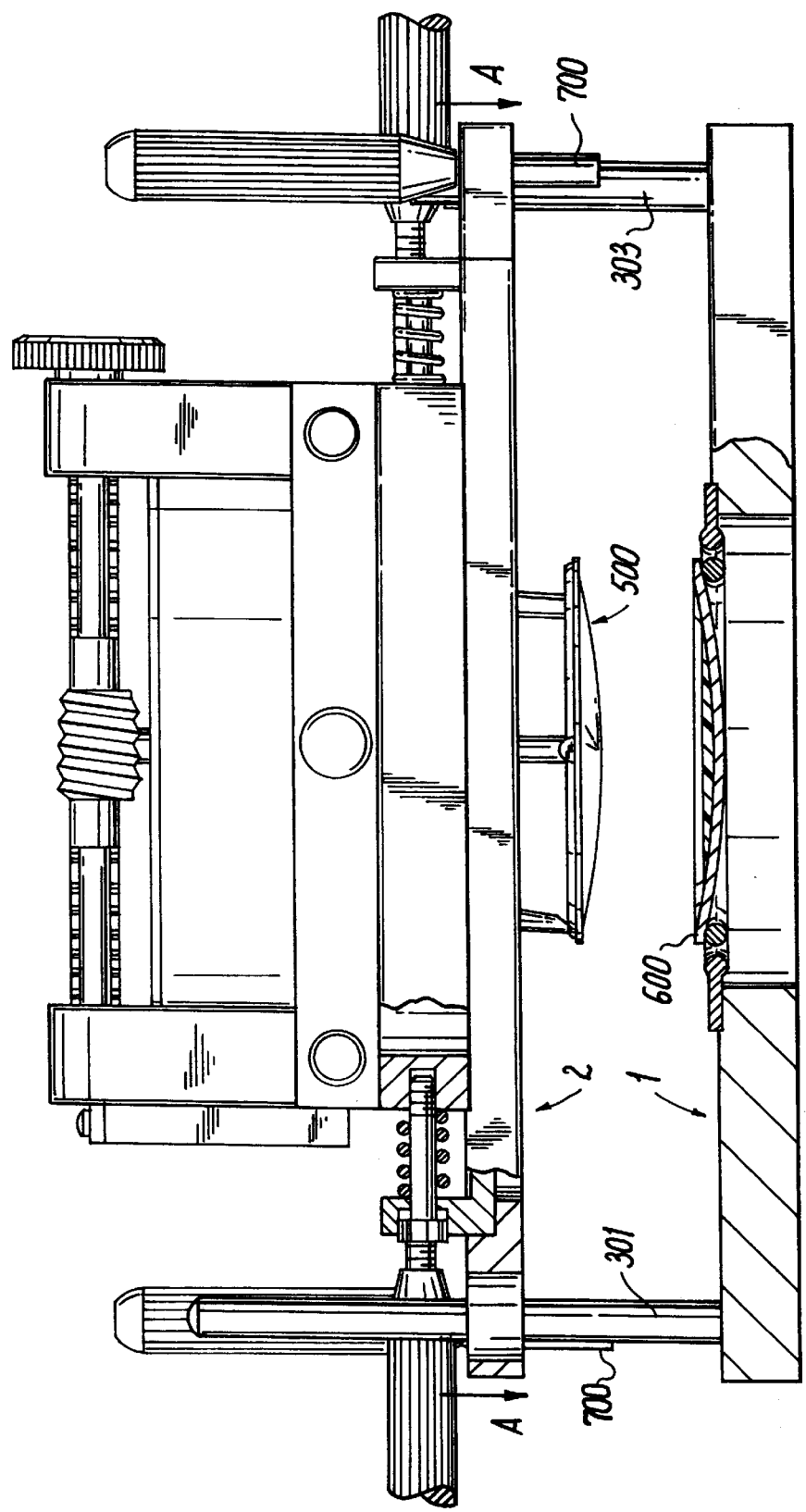
FIG. 6 is a side elevational and partial activating view showing the preform approaching the mold half.
Figure 7:
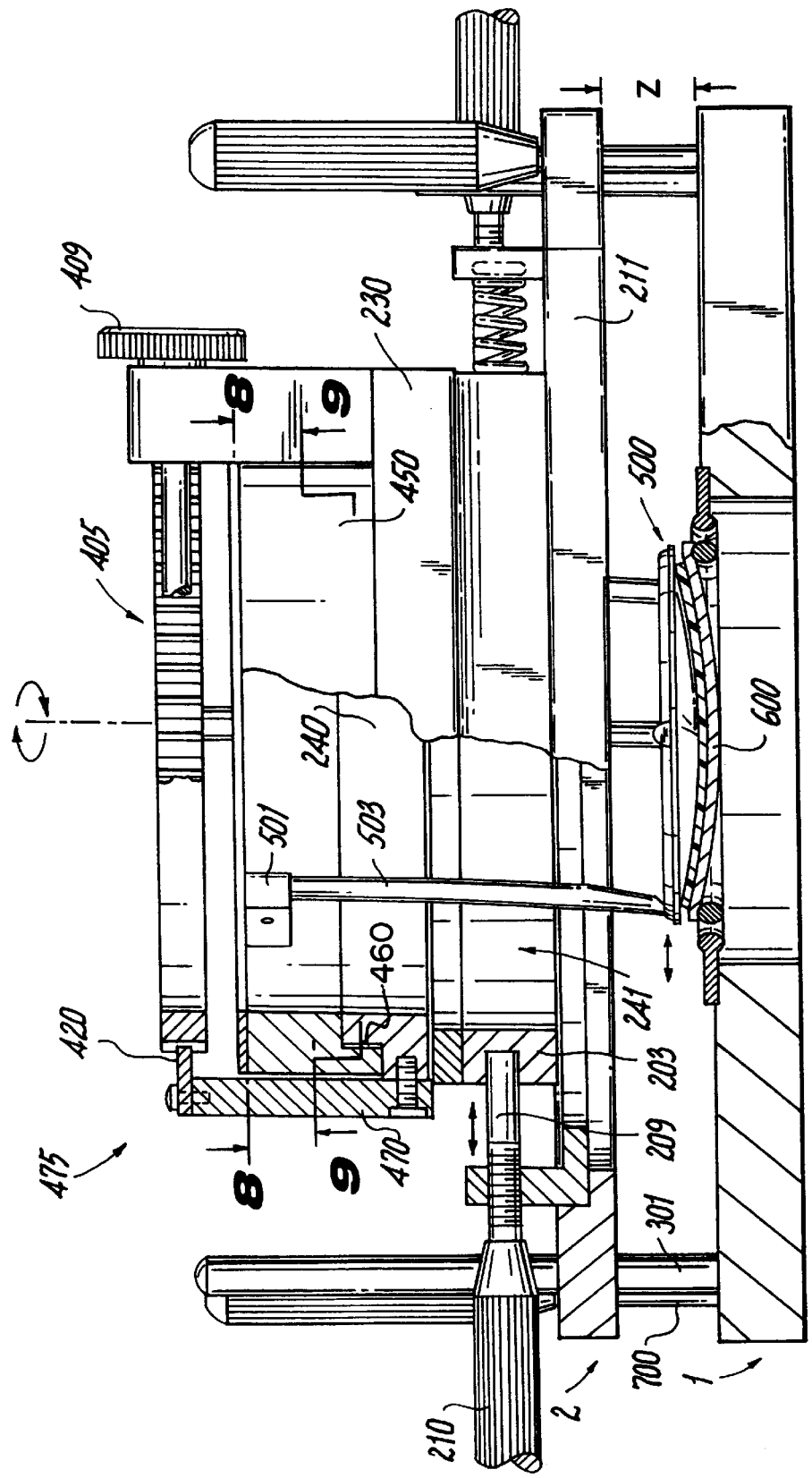
FIG. 7 is a side elevational view, with parts broken away, along the lines 7—7 of FIG. 1.
Figure 8:
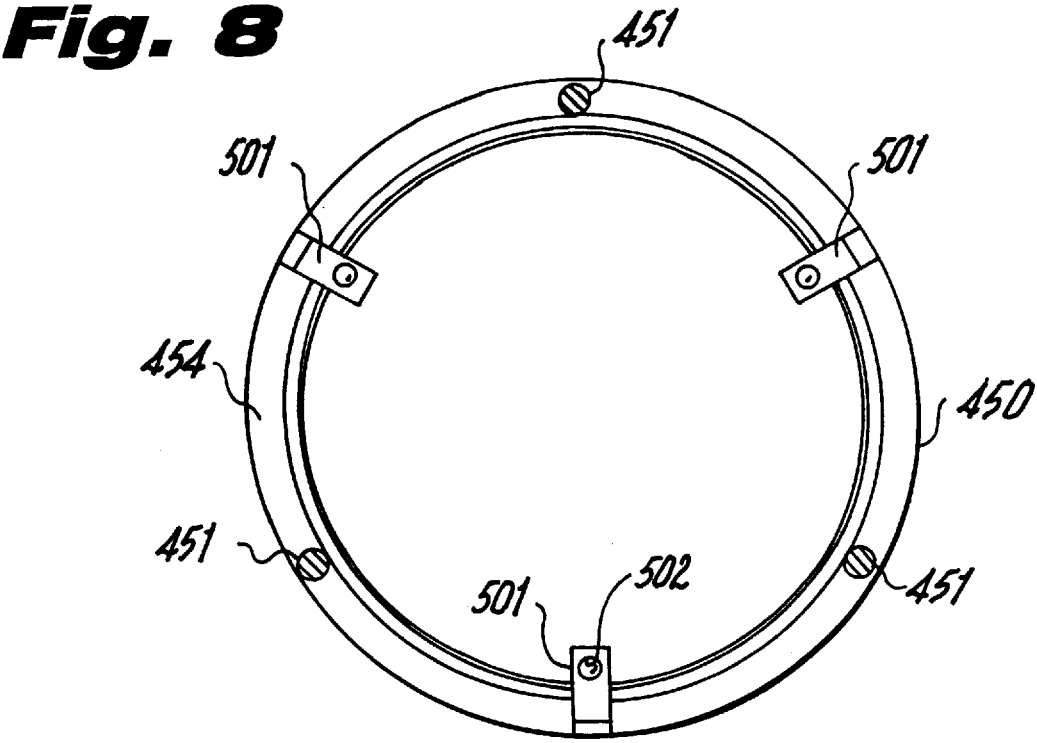
FIG. 8 is a horizontal cross section taken along the line 8—8 of FIG. 7.
Figure 9:
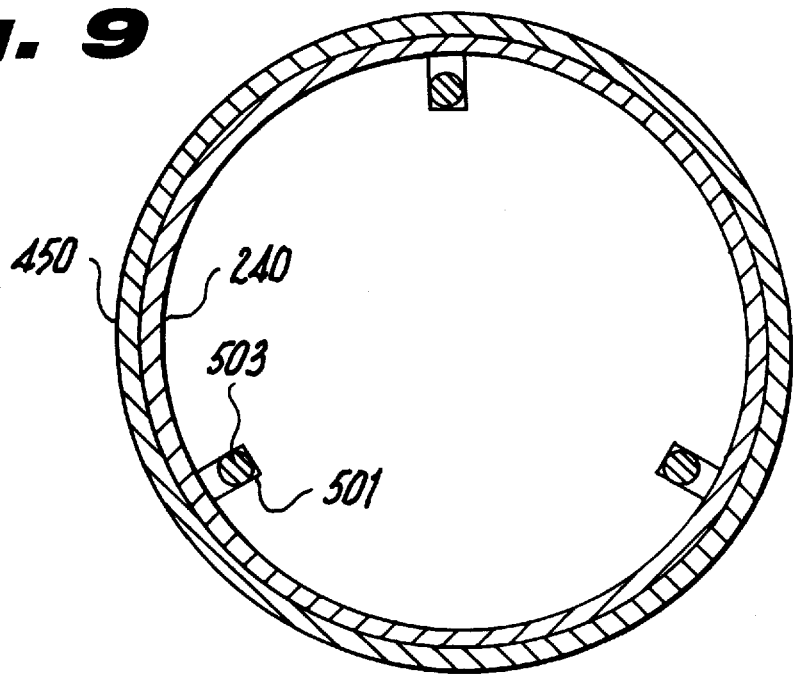
FIG. 9 is a horizontal cross section taken along the line 9—9 of FIG. 7.

In order to utilize the fixture of the present invention in the manufacture of spectacle lenses, the bottom portion 1 is placed on a flat surface or held so that it is level, and the mold half 600 is placed within the holder 101. The top portion 2 is then lowered toward the bottom portion 1 by moving it downwardly along the pins 301–304 as shown by arrow A in FIG. 6. The four micrometer feet 700 are then adjusted to provide the desired height differential between the mold half 600 and the preform 500 when the lens is cast. The micrometer feet are then locked in place by means well known in the art.

Appropriate adjustments are made to the X and Y axes employing the adjustments of upper plate 201 and lower plate 202 and these are then locked into place by means well known in the art. An appropriate angular setting is made employing the worm wheel 408 on the toothed wheel 405 until the appropriate angular indication is seen at indicator 420. This may then be locked in place by means well known in the art.

The fixture is now ready for use and the top portion 2 is raised to allow an appropriate amount of resinous material to be placed in the mold half 600. The top portion is then lowered and the resin is cured, the mechanism of curing depending upon which plastic is employed.

When curing has been completed, the top portion 2 is raised and the cured plastic lens, which is the preform and the cast layer formed by the resin, removed from the mold half. Any flashing is removed and, should it be required, the lens can be machined to a desired size and shape. The fixture is now ready for another casting operation, and need not be readjusted, unless the prescription of the next lens is different from the one just formed.

Any lens-forming material can be employed with the novel fixture of this invention to fabricate spectacle lenses. Materials suitable for use in forming the preform are any materials capable of use as a spectacle lens material. Illustrative materials include, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl- ethyl- and butyl methacrylates and acrylates, styrenics, polyesters, and the like and combinations thereof. Additionally, the preform may be formed from one or more of the phosphine oxides disclosed in U.S. application Ser. No. 08/912,117, incorporated herein in its entirety by reference. Suitable resins for use in casting a layer onto a preform, without limitation, those disclosed in U.S. Pat. No. 5,470,892, incorporated in its entirety herein by reference. Additional suitable monomers include, without limitation, allyl and bis(allyl) carbonates, such as diethylene glycol bis(allyl) carbonate, bisphenol A diallyl carbonate, and the like, acrylic acid, multi-functional acrylates and methacrylates, such as ethylene glycol diacrylate, tetraethylene glycol diacrylate, tripropylene glycol diacrylate, trimethylolpropane triacrylate, tetrahydrofurfuryl methacrylate, tetrahydrofurfuryl acrylate, hexanediolmethacrylate, methyl methacrylate, butyl methacrylate, propyl methacrylate, penterythritol tetraacrylate, urethane acrylates and methacrylates, styrene and styrene derivatives such as divinyl benzene, 4-vinyl anisole, various esters or maleic and itaconic acids, methacrylic and acrylic anhydrides and the like, and combinations thereof. Such monomers are commercially available or methods for their production are known.

Methods for casting prescriptive layers onto a preform are disclosed in U.S. Pat. Nos. 5,147,585, 5,178,800, 5,219,497, 5,316,702, 5,358,672, 5,480,600, 5,512,371, 5,531,940, 5,702,819, 5,793,465, 5k,859,685, 5,861,934, and 5,907,386 and U.S. application Ser. Nos. 09/178,471, 09/270,390, and 09/315,477, all incorporated herein in their entireties by reference. The resin may be cured by any suitable means including, without limitation, radiation cure, thermal cure, visible light cure, and combinations thereof.

A fixture for casting of spectacle lenses has been illustrated where both accuracy and consistency can be assured, for a given lens, and for a series of lenses. The invention should not be considered as limited by the specific examples given, but only as limited by the appended claims.

What is claimed is:

1. A fixture for casting spectacle lenses comprising:
   a. a bottom portion having means for holding a mold half; and
   b. a top portion constructed to operate in association with said bottom portion, said top portion mounting a preform, said top portion having means to:
      i. adjust said upper portion in the X direction;
      ii. adjust said upper portion in the Y direction; and
      iii. adjust the relative angle between said preform and said mold half; and
   c. means for adjusting the distance between said bottom portion and said top portion when said fixture is in the casting position.

2. The fixture of claim 1, wherein said top portion includes an upper plate and a lower plate, said plates being horizontal and parallel, one plate being adapted for controlling movement in the X direction and the other plate being adapted for controlling movement in the Y direction.

3. The fixture of claim 2, wherein means are provided in said upper and lower plates to accommodate a hollow, rotatable, toothed assembly, said preform being mounted to said toothed assembly.

4. The fixture of claim 3, wherein the angle between the mold half and the preform is adjusted by rotation of said assembly.

5. The fixture of claim 3, wherein said preform is suspended from the inside of said toothed assembly.

6. The fixture of claim 3, wherein the preform is held in place by a plurality of pins suspended from mounting plates attached to the inside of said toothed assembly.

7. The fixture of claim 6, wherein said pins have a first, narrowed end held in place in said mounting members and a lower end which holds the preform in place by pressure.

8. The fixture of claim 7, wherein there are three pins.

9. The fixture of claim 6, wherein said preform is formed with an outer rim, said rim fitting within a notched portion at the bottom of each of said pins.

10. The fixture of claim 2, wherein the upper plate includes a stationery, horizontal base plate and a movable portion resting on said base plate.

11. The fixture of claim 10, wherein the base plate includes upstanding flanges to which the movable portion is attached.

12. The fixture of claim 11, wherein the attachment is by means of spring-cushioned pins mounted at the corners of the movable portion and attached to the upstanding flanges.

13. The fixture of claim 11, wherein rods are threadedly mounted in the flanges, and rotatably mounted in the movable portion, whereby rotational movement of said rods causes movement of the movable portion.

14. The fixture of claim 13, wherein said rods comprise a portion of a micrometer.

15. The fixture of claim 2, wherein the lower plate includes a stationery, horizontal base plate and a movable portion resting on said base plate.

16. The fixture of claim 15, wherein the base plate includes upstanding flanges to which the movable portion is attached.

17. The fixture of claim 16, wherein the attachment is by means of spring-cushioned pins mounted at the corners of the movable portion and attached to the upstanding flanges.

18. The fixture of claim 16, wherein rods are threadedly mounted in the flanges and rotatably mounted in the movable portion, whereby rotational movement of said rods use movement of the movable portion.

19. The fixture of claim 17, wherein said rods comprise a portion of a micrometer.

20. The fixture of claim 15, wherein four feet pass through the corners of the base plate of the lower plate, said feet adapted to rest on the bottom portion of said fixture.

21. The fixture of claim 20, wherein the extent to which each foot extends below the top portion is individually controlled by micrometers of which the feet form a part.

22. The fixture of claim 21, wherein the upper plate and the lower plate each include a stationery, horizontal base plate and a movable portion resting on said base plate.

23. The fixture of claim 22, wherein the base plate of the upper plate is rigidly attached to the movable portion of the lower plate.

24. The fixture of claim 22, wherein four feet pass through the corners of the base plate of the lower plate, said feet adapted to rest on the bottom portion of said fixture.

* * * * *